Sept. 11, 1962        M. T. WORST        3,053,932

AIRCRAFT WARNING SYSTEM

Filed Oct. 9, 1959        2 Sheets-Sheet 1

MARC T. WORST
INVENTOR.

BY

ATTORNEYS

Sept. 11, 1962 M. T. WORST 3,053,932
AIRCRAFT WARNING SYSTEM
Filed Oct. 9, 1959 2 Sheets-Sheet 2

MARC T. WORST
INVENTOR.

BY
*Flehr and Swain*
ATTORNEYS

3,053,932
AIRCRAFT WARNING SYSTEM
Marc T. Worst, 110 Russell Ave., Portola Valley, Calif.
Filed Oct. 9, 1959, Ser. No. 845,447
8 Claims. (Cl. 178—6)

This invention relates to an aircraft warning system.

Collision hazards exist between aircraft even during clear weather. During clear weather, visual rules offer only the "see and be seen" concept of safety rather than more rigid airway traffic controls maintained under instrument flight rules in poor weather.

As is well known, aircraft are limited in their vision forward and upward, and almost completely lack vision downward under the aircraft and to the rear. These view limitations, plus the increasing speed of aircraft, plus the growing traffic density near airports has made it imperative to furnish substantial expansion of the pilot's normal vision range in clear weather when he lacks the protection of instrument flight rule control, and must depend upon the "see and be seen" concept for prevention of collision.

Several types of proximity warning indicators, for example, radar, infra-red, ultraviolet, and the like, have been proposed as anti-collision aids. However, in order to discriminate between false signals and actual signals from other aircraft, devices of this type require complicated and complex electronic systems. Furthermore, in general, the only information available is azimuth, elevation and bearing of the nearby aircraft with no indication of its course, speed or size.

After nearby aircraft have been sighted, normal "rules of the road" provide a fundamental means of determining courses in most instances. However, confusion and error may still occur. It is desirable for the pilots, once they view each other, to establish and mutually communicate their courses without ambiguity. Communicating with neighboring aircraft through a ground station requires multiple frequencies and channel hunting before contact can be established. With the relatively fast speeds of the aircraft, this time lag may result in the collision occurring before a line of communication had been established.

It is a general object of the present invention to provide an improved aircraft warning system.

It is another object of the present invention to provide an aircraft warning system for presenting a "picture" of the surrounding air space to the pilot in the cockpit.

It is another object of the present invention to provide a system of the foregoing character in which the pilot discriminates between true and false signals by observing a "picture" of the surroundings.

It is still another object of the present invention to provide a system in which the air space surrounding the aircraft is scanned by a television camera and a television picture of the surroundings is continuously presented to the pilot.

It is still another object of the present invention to provide a system of the above character in which the television camera is locked to an object detecting system such as radar, infra-red, ultraviolet, or the like, carried in the aircraft to scan simultaneously therewith for observing objects detected by the detecting means.

It is a further object of the present invention to provide a system of the foregoing character in which communication between objects can almost instantaneously be established.

These and other objects of the invention will become more clearly apparent from the following description when taken in conjunction with the accompanying drawing.

Referring to the drawing.

Figure 1:
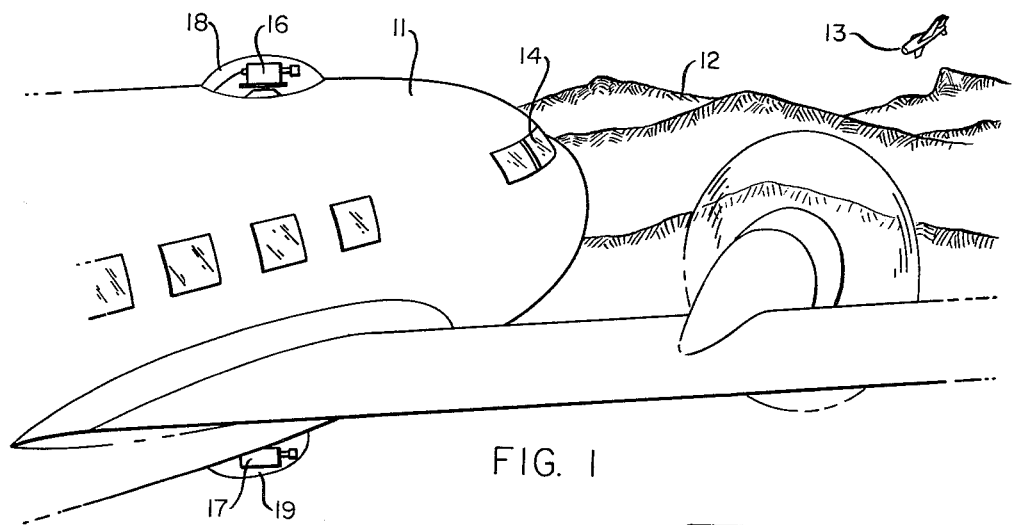
FIGURE 1 is a view showing an aircraft equipped with a scanning television camera and a second aircraft in the surrounding space.

Referring to FIGURE 1, an aircraft 11 is shown flying over surrounding territory which includes hills 12. A second aircraft 13 is flying in the surrounding air space in the vicinity of the hills. The aircraft 11 includes a cockpit having windows 14 through which the pilot observes the forward air space. As previously described, vision is limited in other directions.

The aircraft is provided with television cameras 16 and 17 mounted on the top and bottom with clear plastic bubbles or covers 18 and 19. The cameras are mounted on a suitable scanning mechanism which serves to continuously move the cameras so that they scan a hemispherical area above and below the airplane to observe the air space surrounding the airplane. The cameras are associated with suitable electronic power supplies and circuits for transmitting signals to the cockpit where they are applied to a receiver which forms a visual display. If desired, the cameras may be provided with telephoto lens which may be selectively and automatically associated with the camera to enlarge an object being viewed. The complete television system may, for example, be of the type employed in closed circuit television.

Figures 2, 3:
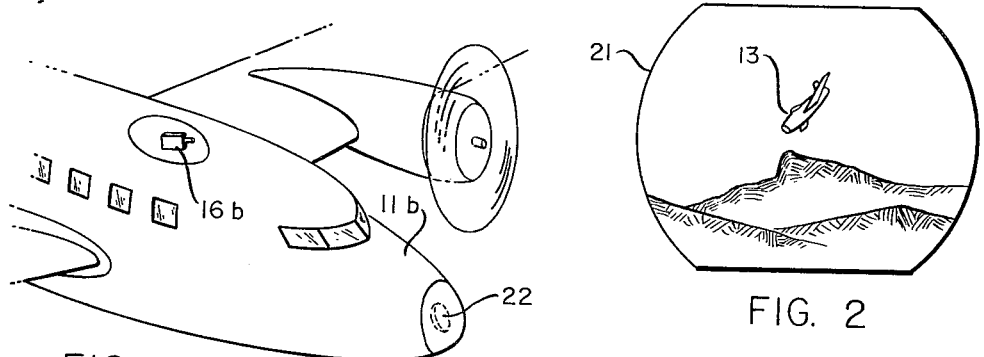
FIGURE 2 shows the visual display presented to the pilot of the aircraft in FIGURE 1.
FIGURE 3 shows an aircraft provided with a scanning camera and a radar scanner.

In the cockpit of the aircraft 11, there is presented a visual display of the type shown in FIGURE 2. For example, as the television camera scans the area in the vicinity of the hills, the visual display 21 shown in FIGURE 2 is presented to the pilot in the cockpit. Although the illustrative example shows the surrounding aircraft in the air space in front of the aircraft and in the vicinity of the hills, it is apparent that the aircraft may be approaching from the rear or from beneath and that the respective cameras 16 and 17 will present a visual display of any aircraft in the surrounding hemispherical air space associated with each camera. Suitable means may be provided in conjunction with the scanning mechanism whereby the pilot may stop the camera for continuously observing a given sector of the surrounding area which includes the object 13. Or, he may cause the camera to scan a predetermined area. Obviously, false signals are rejected since the pilot is observing a picture of the surrounding air space and he can easily discriminate between objects. Thus, no complicated computer is required.

Referring to FIGURE 3, an aircraft 11b is shown which includes a television scanner 16b, and additionally includes a suitable detecting means, for example, a radar scanner 22. Hereinafter, in the description, reference is made to radar. However, it is understood that the invention is not to be limited in this respect and that other object detecting systems may be employed. Means are provided for locking the television scanner for movement with the radar scanner. Thus, if an object is observed by radar, it is possible to lock in the television scanner so that the pilot may obtain a "picture" of the object. It is observed that in this manner false signals which may be obtained, for example, from the surrounding hills or from other objects in the vicinity, as for example, signals which may be obtained from clouds when using infra-red detection systems, may be quickly discriminated. The pilot uses the television system to form a picture and see exactly what is being picked up by the detecting means.

The complete detecting system may be simplified by using the human being as a link in the system for rejecting false signals. It is further observed that by obtaining a visual display of the foregoing character that the pilot may easily see the size, speed and course of the approaching aircraft, and simultaneously take a course which will avoid collision.

If desired, an automatic means may be provided in the cockpit for the pilot to switch to telephoto lens to better view the object which may be at a considerable distance from the airplane. Furthermore, means may be provided whereby when an object is detected, the scanning cycle may be altered to scan only the small sector including the object and to present an enlarged view of this area of the air space.

Figure 4:
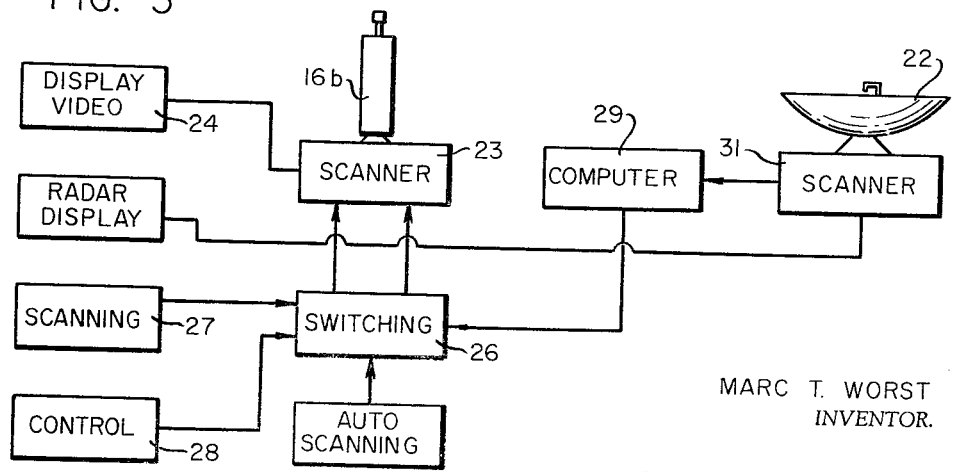
FIGURE 4 shows a block diagram of a system for providing simultaneous scanning by the television camera and an object detecting scanner.

Referring to FIGURE 4, a suitable control system is schematically illustrated. The television camera 16b is mounted on a scanner 23 which provides a suitable scanning motion to the camera so that the surrounds may be periodically and continuously scanned. Signals are obtained from the scanner for synchronizing the operation of the display means 24. The switcher 26 provides means for connecting the scanner directly to receive scanning signals from a scanning generator 27 or signals from a manual control 28. The switching means 26 may also be connected to receive signals from a computer 29 which processes signals from the radar scanner 31. Thus, the computer transmits a signal to the switching means 26 which signal can be employed to guide the scanner 23 to cause the television camera 16b to track with the radar scanner 22.

Assuming that both aircraft are employing a television system or detecting system of this character which includes television cameras, it is possible for the pilots to communicate with one another by means of an ordinary light installed in the airplane and directed towards the approaching aircraft. Thus, by using Morse code, for example, one pilot may tell the other exactly which course he is going to take. The data is immediately transmitted without the necessity of channel location and communication to a ground station. If an infra-red detecting source is being employed, the infra-red detecting source may be used for communication, and if radar is being used, the radar may be pulsed to communicate the information to the other pilot. In any event, when the radar scanner is tracking an object, means are provided for projecting a wave beam which can be employed to communicate with the pilot of the other object. The communication is established almost instantaneously and each can notify the other of the course which he proposes to take and to thereby reduce the lost time which may be the fatal time in collision.

Figure 5:
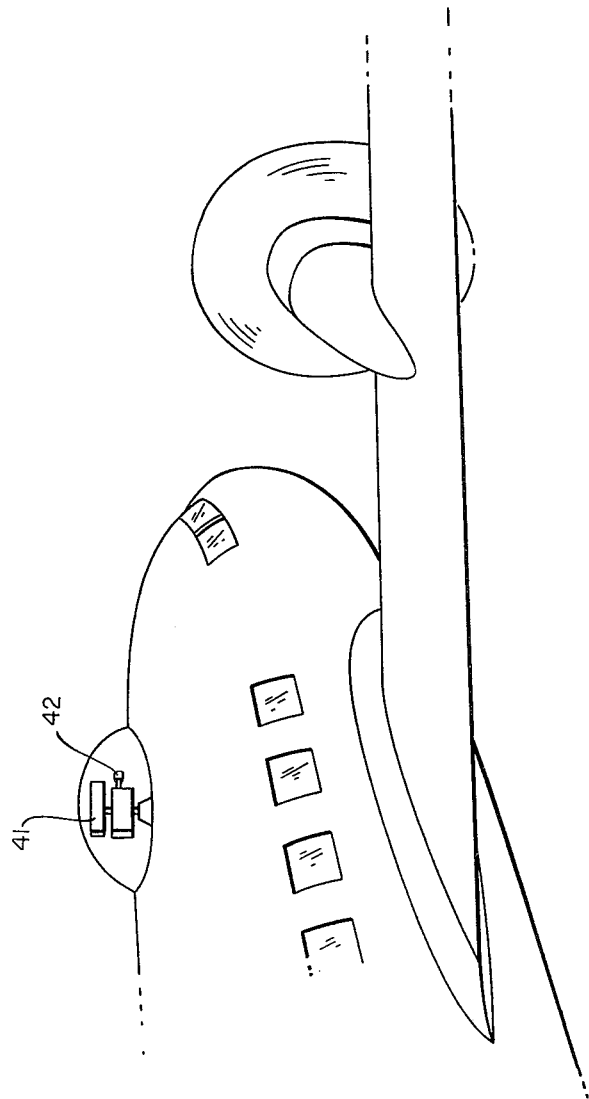
FIGURE 5 shows another embodiment of the invention in which the television camera and detecting means are mounted for simultaneous scanning.

In FIGURE 5, there is shown a system in which an infra-red detector 41 is mounted for scanning with a camera 42. Thus, the two can scan the area continuously. When an object is spotted, they may be caused to track the object and a visual display can be formed. The infra-red detector may provide the means for communication with the other aircraft, and again a communication link is set up. It is to be understood that the infra-red detectors 41 can be on a separate scanner and likewise that the radar reflector can be mounted for conjoint movement with the camera. It is further to be understood that other means of detecting objects, for example, ultraviolet and the like, may be employed for the detecting system which initially detects the object in the surrounding area. The camera may be locked in to allow the pilot to discriminate against false signals and to obtain a visual display of the object so that he may alter his course accordingly.

The system may be employed in objects other than airplanes. Where an object is remote controlled, the output of the video camera may be transmitted to the control center whereby the flying objects may be controlled to avoid other objects in the sky. Furthermore, a system of the foregoing character may be employed in ocean traffic where many collisions have occurred although the ships have been able to detect one another on radar. With the foregoing system, it may be possible to provide means for communication directly between the ships instantaneously without having to go through radio channel and find one another. Thus, much time which may be lost in trying to communicate is saved. Furthermore, a telephoto camera might provide some vision where with radar it is not possible to view the other object to obtain direction, etc.

I claim:

1. A system of the character described for presenting a faithful and realistic visual display of the space surrounding a moving carrier to a control station within the carrier, said system comprising object detecting means connected to provide a general sweeping scan of the surrounds to detect objects and form a signal when an object is detected, at least one video camera, camera mounting means arranged to move the camera and to cause the camera to scan a selected area, means connected to control the camera mounting means in response to the signal of the object detecting means to cause the camera to scan the area of an object as detected by said detecting means, and means disposed at the control station and connected to receive the output of the camera and to form a faithful and realistic visual display of the object detected.

2. A system as in claim 1 wherein the object detecting means comprises radar.

3. A system as in claim 1 wherein the object detecting means comprises an infra-red detector.

4. A system as in claim 1 wherein the object detecting means comprises ultraviolet detecting means.

5. A system as in claim 1 wherein the object detecting means comprises ultrasonic detecting means.

6. A system of the character described for presenting a faithful and realistic visual display of the space surrounding a moving carrier, said system comprising an object detecting means mounted on said moving carrier and serving to provide a general sweeping scan of the surrounds, said object detecting means connected to provide a control signal when an object is detected, a video camera, means supporting said camera and arranged to move the same to scan the surrounds conjointly with said object detecting means, display means connected to receive signals from said camera to provide a faithful and realistic visual display of the surrounds scanned by said object detecting means, and means responsive to said control signal to limit scanning of said video camera to the sector of the surrounds including said detected object.

7. An object detecting system for visually displaying the surroundings of an aircraft to an operator, said system comprising a radar scanning means mounted on said aircraft and arranged to provide a sweeping scan of the environs of said aircraft, a first and second television camera mounted respectively above and below said aircraft and supported thereby, said first television camera being arranged to scan the hemisphere above said aircraft, said second television camera being arranged to scan the hemisphere below said aircraft, means coupling the radar scanning synchronously to the scanning of said cameras, said television cameras including telephoto lenses selectively operable to provide an enlarged faithful visual presentation of the area scanned by said cameras, visual display means connected to each of said television cameras for providing a faithful and realistic visual view as scanned by said cameras, radar display means connected to said radar scanning means to provide a visual radar presentation of the environs, and means selectively operable to restrict scanning of said television cameras within selected limits whereby the unfaithful radar presentation can be faithfully realized under direction of said radar scanning means.

8. An invention as defined in claim 1 further including means synchronizing the movements of the camera mounting means with the movements of the object detecting means.

References Cited in the file of this patent

UNITED STATES PATENTS

| | | |
|---|---|---|
| 2,288,871 | Adams | July 7, 1942 |
| 2,842,760 | McLucas | July 8, 1958 |